US008547338B2

(12) United States Patent
Park et al.

(10) Patent No.: US 8,547,338 B2
(45) Date of Patent: Oct. 1, 2013

(54) DISPLAY DEVICE AND DRIVING METHOD THEREOF

(75) Inventors: Jong-Woung Park, Seongnam-si (KR); Young-Ok Cha, Gwangmyeong-si (KR); Kee-Han Uh, Yongin-si (KR); Joo-Hyung Lee, Gwacheon-si (KR)

(73) Assignee: Samsung Display Co., Ltd. (KR)

( * ) Notice: Subject to any disclaimer, the term of this patent is extended or adjusted under 35 U.S.C. 154(b) by 1480 days.

(21) Appl. No.: 11/929,379

(22) Filed: Oct. 30, 2007

(65) Prior Publication Data

US 2008/0117181 A1 May 22, 2008

(30) Foreign Application Priority Data

Nov. 21, 2006 (KR) .................. 10-2006-0115002

(51) Int. Cl.
*G06F 3/041* (2006.01)
*G09G 3/36* (2006.01)

(52) U.S. Cl.
USPC .......................... 345/173; 345/104

(58) Field of Classification Search
USPC ........................................ 345/173
See application file for complete search history.

(56) References Cited

U.S. PATENT DOCUMENTS

| 4,374,381 | A | * | 2/1983 | Ng et al. ............... 345/173 |
| 5,777,596 | A | * | 7/1998 | Herbert ............... 345/104 |
| 7,602,380 | B2 | * | 10/2009 | Yoshida et al. ........... 345/173 |
| 2003/0063074 | A1 | * | 4/2003 | Kumagawa et al. ........ 345/204 |
| 2004/0119700 | A1 | * | 6/2004 | Ichikawa ............... 345/173 |

FOREIGN PATENT DOCUMENTS

JP     2000-010720     1/2000

* cited by examiner

*Primary Examiner* — Charles V Hicks
(74) *Attorney, Agent, or Firm* — Innovation Counsel LLP (57) ABSTRACT

A display panel includes a plurality of pixels; a plurality of detection units formed in row and column directions that generate an element output signal when the display panel is touched; a detection signal processor that generates detection data based on the element output signal; and a touch determination unit that classifies the detection data in a row or column direction, that converts a row or column coordinate of a touch position or sustains a previous coordinate by comparing a reference value of each direction with the detection data, and that determines whether the touch has occurred according to the conversion number of the row or column coordinate. When the screen is continuously touched along a row or column direction, the touch or lack thereof and its position can be accurately determined by using the previous touch position information as current touch position information.

21 Claims, 10 Drawing Sheets

DISPLAY DEVICE AND DRIVING METHOD THEREOF

CROSS-REFERENCE TO RELATED APPLICATION

This application claims priority to and the benefit of Korean Patent Application No. 10-2006-0115002 filed in the Korean Intellectual Property Office on Nov. 21, 2006, the entire contents of which are incorporated herein by reference.

BACKGROUND OF THE INVENTION

1. Field of the Invention

The present invention relates to a display device.

2. Description of the Related Art

Cathode ray tubes are being replaced with flat panel displays because of the lighter weight and thinner displays made possible by flat panel technology. Flat panel displays include liquid crystal displays (LCDs), field emission displays (FEDs), organic light emitting displays, and plasma display panels (PDPs).

In general, in an active matrix type of flat panel display, a plurality of pixels are arranged in a matrix form, and an image is displayed by controlling the light intensity of each pixel according to encoded luminance information. The LCD includes two display panels having pixel electrodes and a common electrode, and a liquid crystal layer that has dielectric anisotropy that is disposed between the electrode panels. The LCD applies an electric field to the liquid crystal layer and controls the transmittance of light passing through the liquid crystal layer according to the intensity of the electric field, thereby displaying a desired image.

A touch screen panel is a device for enabling a machine such as a computer to perform a desired instruction by writing a character, drawing a picture, or executing an icon by touching a finger, a touch pen (stylus) or the like on a screen. The LCD to which the touch screen panel is attached can determine whether a user's finger, a touch pen, etc. has touched the screen as well as the location of the touched position. However, the touch screen panel increases cost and decreases yield decrease because of the process for bonding the touch screen panel to the liquid crystal panel. In addition, the touch panel decreases the luminance and increases the thickness of the display apparatus.

Efforts have been made to incorporate a detection element within the LCD panel to determine whether a user's finger, etc., is touched on a screen as well at the location of the touch position. These efforts include detecting a change of light or pressure when the user's finger, etc., is applied to the screen.

SUMMARY OF THE INVENTION

An exemplary embodiment of the present invention provides a display device including: a display panel that includes a plurality of pixels; a plurality of detection units that are formed in row and column directions in the display panel and that generate an element output signal based on a touch to the display panel; a detection signal processor that generates detection data based on the element output signal; and a touch determination unit that classifies the detection data in row and column directions, that changes a row or column coordinate of a touch position or sustains a previous coordinate by comparing a reference value of each direction with the detection data, and that determines whether the touch has occurred according to the changed value of the row or column coordinate.

The touch determination unit may compare a representative value of a plurality of detection data of the row direction with a reference value, and compare a representative value of a plurality of detection data of the row direction with the reference value.

The representative value may be the largest value of the plurality of detection data.

The touch determination unit may determine a coordinate of the representative value as a touch position if the representative value is greater than the reference value, and sustain a previous touch position if the representative value is smaller than or equal to the reference value.

The touch determination unit may determine that a touch has occurred if both of the row and column coordinates are changed. The touch determination unit may sustain a previous touch state if one of the row and column coordinates is changed. The touch determination unit may determine that the touch has not occurred if both of the row and column coordinates are not changed.

The touch determination unit may further include a register for storing a plurality of flag values. The register may store a touch position flag and a touch state flag.

The detection unit may include a variable capacitor that has liquid crystal as a dielectric material and whose capacitance changes according to applied pressure as well as a reference capacitor that is connected in series with the variable capacitor.

The touch determination unit may include hard-wired logic.

The touch determination unit may include an advanced RISC machine (ARM) processor. The touch determination unit may further include a data classification unit for classifying the detection data into row and column detection data, and a memory for storing the classified row and column detection data.

Another embodiment of the present invention provides a driving method for a display device including a plurality of detection units for detecting a touch and a plurality of pixels, including: reading an output signal from a detection unit of row and column directions to generate detection data; classifying the row and column detection data according to direction and changing a row or column coordinate of a touch position or sustaining a previous coordinate by comparing the detection data of each direction with a reference value of each direction; and determining whether the touch has occurred according to a change in the touch position.

The determination of whether a touch has occurred may include classifying the row and column detection data according to the direction; selecting a representative value of the detection data of each direction; comparing a representative value of each direction with the reference value; and changing or sustaining a coordinate of a touch position according to a compared result.

The representative value may be the largest value of a plurality of detection data.

Determining the touch position may include determining a coordinate of the representative value as a touch position if the representative value is greater than the reference value, and determining a previous touch position as the current touch position if the representative value is smaller than or equal to the reference value.

Determining of whether a touch has occurred may include determining that a touch has occurred if both of the row and column coordinates of the touch position are changed, and determining that the touch has not occurred if both of the row and column coordinates of the touch position are not changed.

The determining of whether the touch has occurred may include sustaining a previous touch state if one of the row and column coordinates of the touch position is changed.

The element output signal may be generated according to the change of capacitance by the touch.

The detection data may be generated according to a difference between a previous element output signal and a current element output signal.

In the prior art, detection elements are arranged in row and column directions that provide an output signal when a touch is detected. However, when the screen is continuously touched along a row or column direction, a signal is continuously generated in one direction but not in the other direction, making it difficult to determine whether a touch is accurately detected.

DETAILED DESCRIPTION

The present invention, according to one aspect thereof, provides a display device that continuously derives touch information even when the display is continuously touched along a row or column direction.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, an LCD, which is an exemplary embodiment of a display device according to the present invention, will be described in detail with reference to FIGS. 1 to 6.

Figure 1:
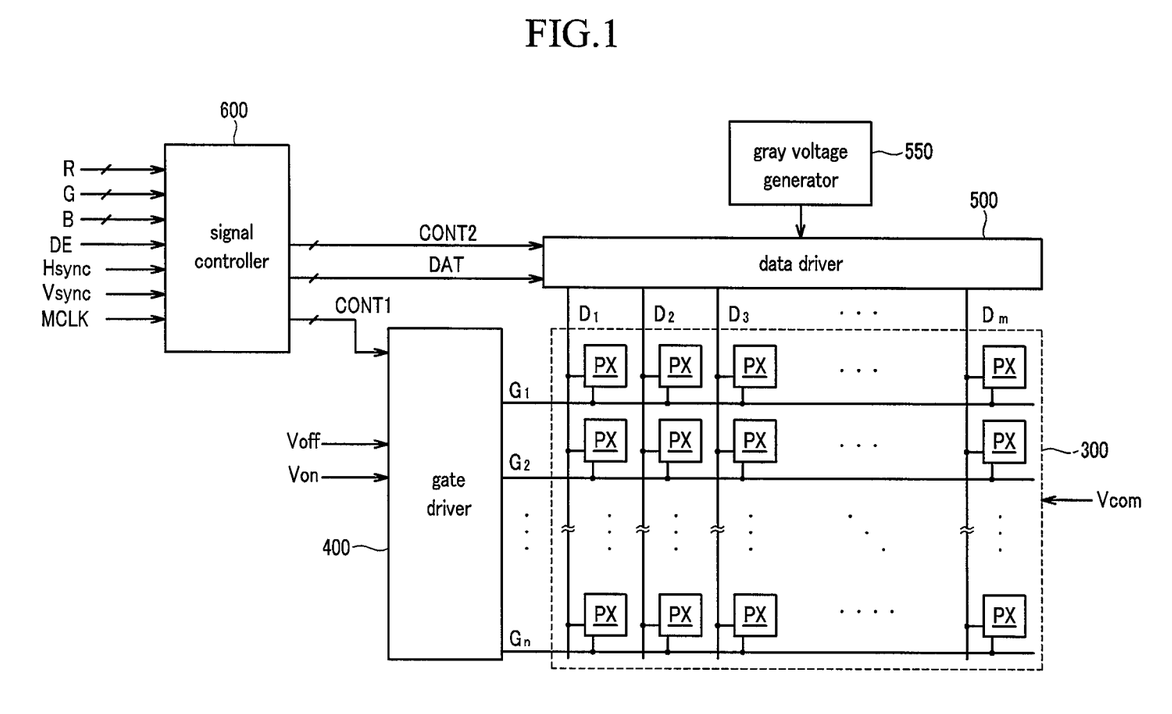
FIG. 1 is a block diagram of an LCD according to an exemplary embodiment of the present invention, where the LCD includes a pixel.
Figure 2:
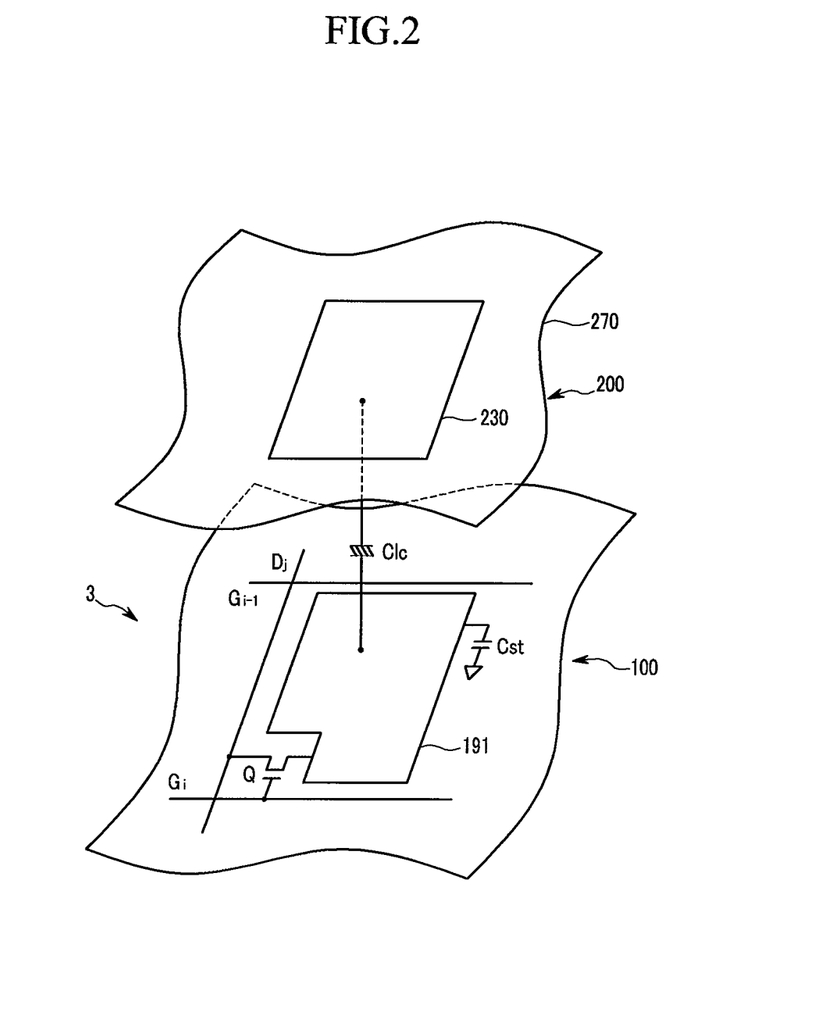
FIG. 2 is an equivalent circuit diagram of a pixel of an LCD according to an exemplary embodiment of the present invention.
Figure 3:
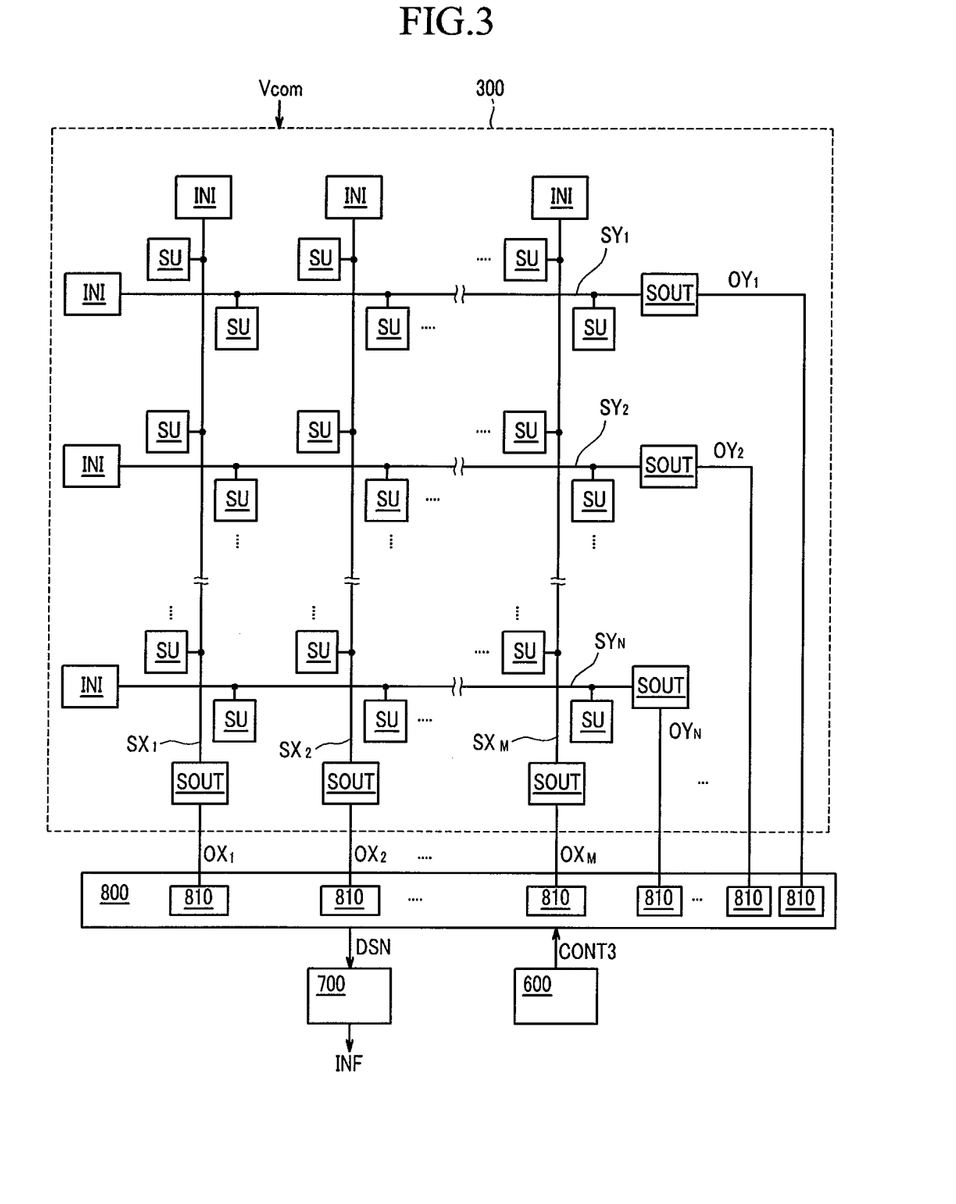
FIG. 3 is a block diagram of an LCD according to an exemplary embodiment of the present invention, where the LCD includes a detection unit.
Figure 4:
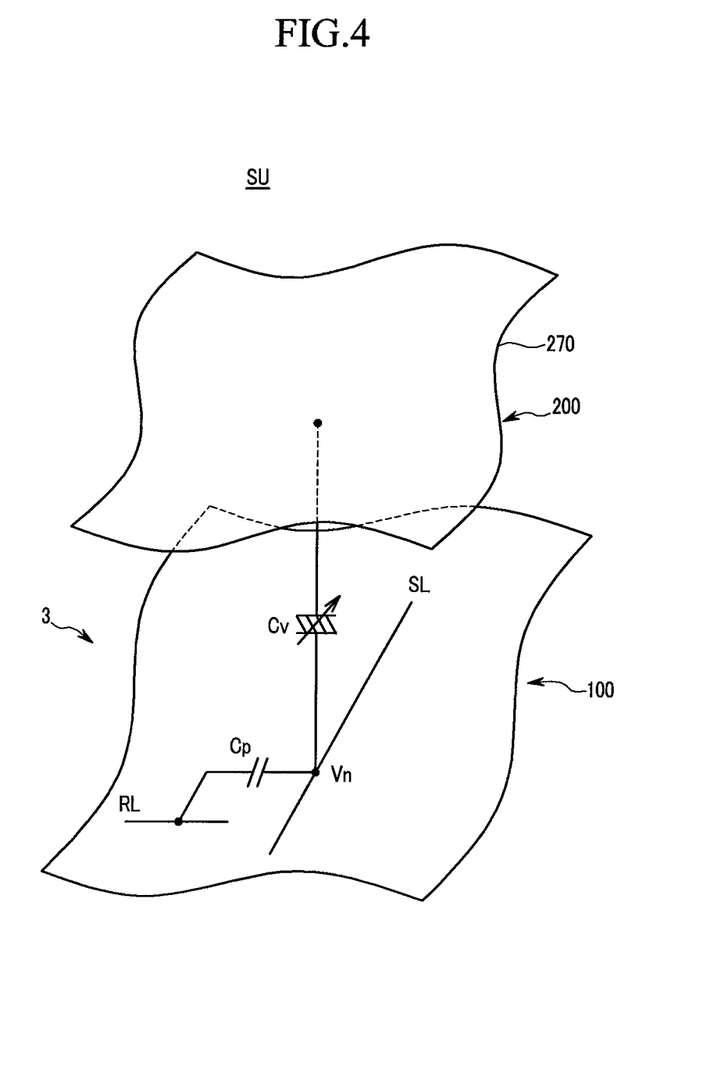
FIG. 4 is an equivalent circuit diagram of a detection unit of an LCD according to an exemplary embodiment of the present invention.
Figure 5:
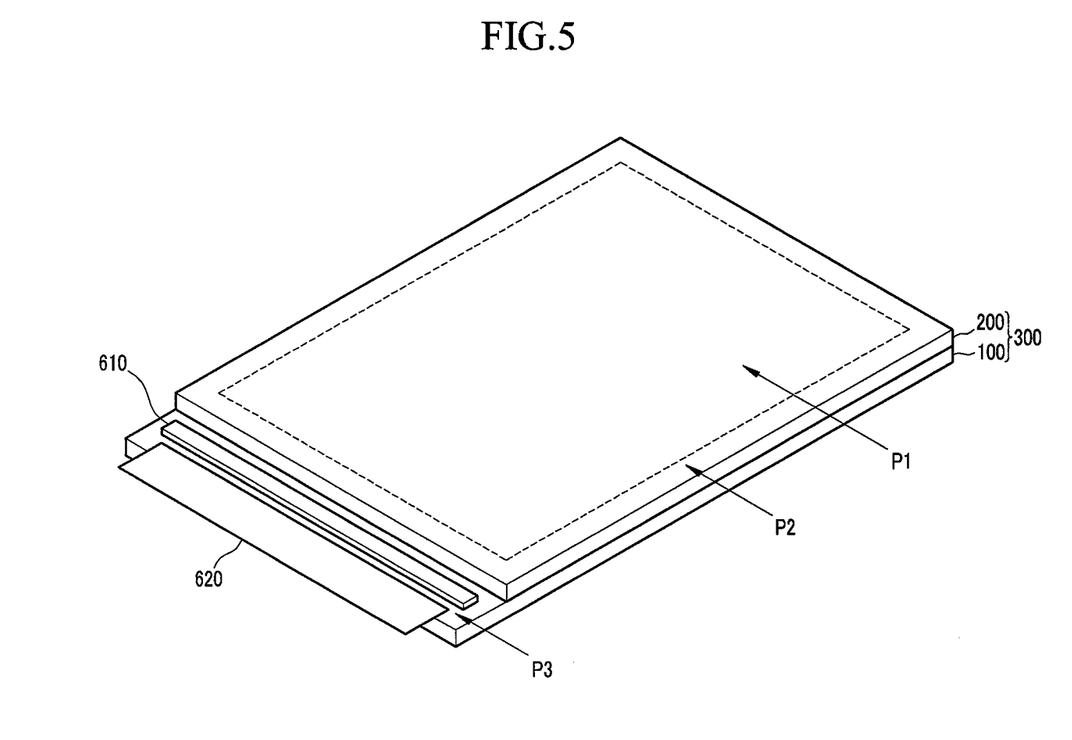
FIG. 5 is a schematic diagram of an LCD according to an exemplary embodiment of the present invention.
Figure 6:
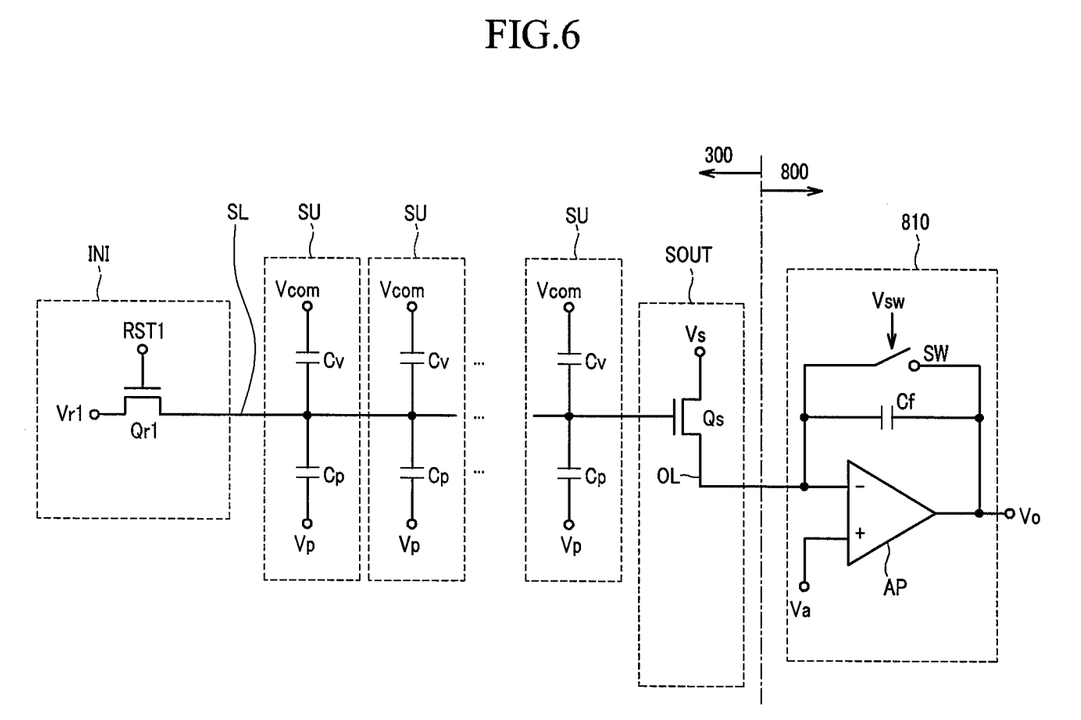
FIG. 6 is an equivalent circuit diagram of a plurality of detection units that are connected to a detection data line in an LCD according to an exemplary embodiment of the present invention.

FIG. 1 is a block diagram of an LCD according to an exemplary embodiment of the present invention, where the LCD includes a pixel, FIG. 2 is an equivalent circuit diagram of a pixel of an LCD according to an exemplary embodiment of the present invention, and FIG. 3 is a block diagram of an LCD according to an exemplary embodiment of the present invention, where the LCD includes a detection unit. FIG. 4 is an equivalent circuit diagram of a detection unit of an LCD according to an exemplary embodiment of the present invention, FIG. 5 is a schematic diagram of an LCD according to an exemplary embodiment of the present invention, and FIG. 6 is an equivalent circuit diagram of a plurality of detection units that are connected to a detection data line in an LCD according to an exemplary embodiment of the present invention.

Referring to FIGS. 1 to 3, the LCD according to an exemplary embodiment of the present invention includes a liquid crystal panel assembly 300, a gate driver 400 that is connected thereto, a data driver 500, a detection signal processor 800, a gray voltage generator 550 that is connected to the data driver 500, a touch determination unit 700 that is connected to the detection signal processor 800, and a signal controller 600 that controls them.

The liquid crystal panel assembly 300 includes a plurality of display signal lines $G_1$-$G_n$ and $D_1$-$D_m$ and a plurality of pixels PX that are connected thereto and arranged in approximately a matrix form. The liquid crystal panel assembly 300 also includes a plurality of detection signal lines $SY_1$-$SY_N$, $SX_1$-$SX_M$, and RL, and a plurality of detection units SU that are connected thereto and arranged in approximately a matrix form, a plurality of reset signal input units INI each of which is connected to one end of a respective one of the detection signal lines $SY_1$-$SY_N$ and $SX_1$-$SX_M$, a plurality of detection signal output units SOUT each of which is connected to the other end of the respective detection signal lines $SY_1$-$SY_N$ and $SX_1$-$SX_M$, and a plurality of output data lines $OY_1$-$OY_N$ and $OX_1$-$OX_M$ each of which is connected to the respective detection signal output units SOUT.

Referring to FIGS. 2 to 4, the liquid crystal panel assembly 300 includes a thin film transistor array panel 100 and a common electrode panel 200 that are opposite to each other, a liquid crystal layer 3 that is disposed between the panels, and a spacer (not shown) that forms a gap between the two display panels and that somewhat compressively deforms.

The display signal lines $G_1$-$G_n$ and $D_1$-$D_m$ include a plurality of gate lines $G_1$-$G_n$ for transferring gate signals, and a plurality of data lines $D_1$-$D_m$ for transferring data signals. The detection signal lines $SY_1$-$SY_N$, $SX_1$-$SX_M$, and RL include a plurality of row detection data lines $SY_1$-$SY_N$ and a plurality of column detection data lines $SX_1$-$SX_M$ for delivering a detection data signal, and a plurality of reference voltage lines RL for delivering a reference voltage. The reference voltage swings between a high level and a low level with a fixed period, and the reference voltage line RL may be omitted.

The gate lines $G_1$-$G_n$ and the row detection data lines $SY_1$-$SY_N$ extend in approximately a row direction and are almost parallel to each other while the data lines $D_1$-$D_m$ and the column detection data lines $SX_1$-$SX_M$ extend in approximately a column direction and are almost parallel to each other.

As shown in FIG. 2, each pixel PX, for example a pixel PX that is connected to an i-th (i=1, 2, ..., n) gate line $G_i$ and a j-th (j=1, 2, ..., m) data line $D_j$, includes a switching element Q that is connected to the signal lines $G_i$ and $D_j$, and a liquid crystal capacitor Clc and a storage capacitor Cst that are connected thereto. The storage capacitor Cst may be omitted as needed.

Each switching element Q is a three terminal element such as a thin film transistor that is provided in the thin film transistor array panel 100, and a control terminal thereof is connected to a gate line $G_1$-$G_n$, an input terminal thereof is connected to a data line $D_1$-$D_m$, and an output terminal thereof is connected to the liquid crystal capacitor Clc and the storage capacitor Cst. The thin film transistor includes amorphous silicon or polycrystalline silicon.

Each liquid crystal capacitor Clc has a pixel electrode 191 of the thin film transistor array panel 100 and a common electrode 270 of the common electrode panel 200 as two terminals, and the liquid crystal layer 3 between two electrodes 191 and 270 functions as a dielectric material. The pixel electrode 191 is connected to the switching element Q, and the common electrode 270 is formed on an entire surface of the common electrode panel 200 and receives a common voltage Vcom. Unlike FIG. 2, the common electrode 270 may be provided on the thin film transistor array panel 100 so that at least one of the electrodes 191 and 270 may be formed in a line shape or a bar shape.

The storage capacitor Cst acts as an assistant of the liquid crystal capacitor Clc and is formed by the overlap of a separate signal line (not shown) and the pixel electrode 191 in the thin film transistor array panel 100 with an insulator interposed therebetween. A predetermined voltage such as a common voltage Vcom is applied to the separate signal line. However, the storage capacitor Cst may be formed with the overlap of the pixel electrode 191 and a previous gate line directly on the electrode 191 via the insulator.

Colors may be displayed either by allowing each pixel PX to display one of the primary colors (spatial division) or by sequentially displaying each of the primary colors (temporal division). An example of a set of the primary colors includes red, green, and blue colors. FIG. 2 shows as an example of spatial division in which each pixel PX is provided with a color filter 230 for displaying one of the primary colors in a region of the common electrode panel 200 corresponding to the pixel electrode 191. Unlike the FIG. 2, the color filter 230 may be formed on or under the pixel electrode 191 of the thin film transistor array panel 100.

At least one polarizer (not shown) for polarizing light is attached to an external surface of the liquid crystal panel assembly 300.

As shown in FIG. 4, each detection unit SU includes a variable capacitor Cv that is connected to a row or column detection data line (hereinafter, referred as to a "detection data line") SL. A reference capacitor Cp is connected between the detection data line SL and a reference voltage line RL.

The reference capacitor Cp, the reference voltage line RL and the detection data line SL of the thin film transistor array panel 100 are overlapped by a dielectric material (not shown).

The variable capacitor Cv has the detection data line SL of the thin film transistor array panel 100 and the common electrode 270 of the common electrode panel 200 as its two terminals. The liquid crystal layer 3 between the two terminals functions is the dielectric material. The capacitance of the variable capacitor Cv is changed by external stimulation such as a user's touch applied to the liquid crystal panel assembly 300. When pressure is applied to the common electrode panel 200, a spacer is compressively deformed changing the distance between two terminals and the capacitance of the variable capacitor Cv. If the capacitance changes, the magnitude of the touch point voltage Vn between the reference capacitor Cp and the variable capacitor Cv changes depending on the magnitude of the change in capacitance. The touch point voltage Vn is a detection data signal and flows through detection data line SL so the presence or absence of a touch can be determined.

The detection unit SU is disposed between two adjacent pixels PXs. The density of a pair of detection units SU each of which is connected to an adjacent one of the row and a column detection data lines $SY_1$-$SY_N$ and $SX_1$-$SX_M$ may be, for example, about ¼ of the dot density. A dot that is arranged, for example, in parallel, includes three pixels PX for displaying the three primary colors becomes a basic unit for displaying the resolution of an LCD. However, one dot may be composed of at least 4 pixels PX, and in this case each pixel PX can display one of three primary colors and white color.

The density of a pair of detection units SU that is ¼ of dot density occurs when the row and column resolution of a pair of detection units SU is ½ of the row and column resolution of the LCD, respectively. A pixel row and a pixel column having no detection unit SU may exist.

If the density of the detection unit SU and dot density are set as described above, an LCD can be applied even to an application field requiring high accuracy such as character recognition. The resolution (more properly, the granularity) of the detection unit SU may be higher or lower as needed.

In the detection unit SU according to an exemplary embodiment of the present invention, because the space occupied by the detection unit SU and the detection data line SL is relatively small, the decrease in aperture ratio of the pixel PX is minimal.

Referring to FIG. 6, a plurality of reset signal input units INI each has the same structure and includes a reset transistor Qr. The reset transistor Qr is a three terminal thin film transistor having a control terminal connected to a reset control signal RST, an input terminal connected to a reset voltage Vr, and an output terminal connected to a detection data line SL (i.e., $SX_1$-$SX_M$ or $SY_1$-$SY_N$ in FIG. 3). The reset transistor Qr is positioned at an edge area P2 of the liquid crystal panel assembly 300 not having a pixel, and supplies a reset voltage Vr to the detection data line SL according to the reset control signal RST.

A plurality of detection signal output units SOUT are provided, each having the same structure and including an output transistor Qs. The output transistor Qs is also a three terminal thin film transistor having a control terminal connected to the detection data line SL, an input terminal connected to the input voltage Vs, and an output terminal connected to the output data line OL. The output transistor Qs is also positioned at the edge area P2 of the liquid crystal panel assembly 300, and generates an output signal based on a detection data signal flowing through the detection data line SL. The output signal includes an output current. Alternatively, the output transistor Qs may generate a voltage as an output signal.

The reset transistor Qr and the output transistor Qs, which are thin film transistors, are formed along with the switching element Q for the gate lines $G_1$-$G_n$.

Each of a plurality of row and column output data lines $OY_1$-$OY_N$ and $OX_1$-$OX_M$ is connected to a respective one of the row and column detection data lines $SY_1$-$SY_N$ and $SX_1$-$SX_M$ through the corresponding detection signal output unit SOUT. The output data lines $OY_1$-$OY_N$ and $OX_1$-$OX_M$ are connected to the detection signal processor 800, and transfer an output signal from the detection signal output unit SOUT to the detection signal processor 800. The row and column output data lines $OY_1$-$OY_N$ and $OX_1$-$OX_M$ extend in approximately a column direction and are almost parallel to each other.

Referring to again FIGS. 1 and 3, the gray voltage generator 550 generates two gray voltage sets (or a reference gray voltage set) that are related to transmittance of a pixel. One of two sets has a positive value for a common voltage Vcom, and the other set has a negative value.

The gate driver 400 is connected to the gate lines $G_1$-$G_n$ of the liquid crystal panel assembly 300 to apply a gate signal consisting of a combination of a gate-on voltage Von for turning on a switching element Q and a gate-off voltage Voff for turning off the switching element Q to the gate lines $G_1$-$G_n$.

The data driver 500 is connected to the data lines $D_1$-$D_m$ of the liquid crystal panel assembly 300, selects a gray voltage from the gray voltage generator 550, and applies the selected gray voltage as a data signal to the data lines $D_1$-$D_m$. However, when the gray voltage generator 550 does not provide a voltage for all grays but provides only a predetermined number of reference gray voltages, the data driver 500 generates gray voltages for all grays by dividing the reference gray voltages, and selects a data signal among them.

The detection signal processor 800 includes a plurality of amplifying units 810 that are connected to output data lines $OY_1$-$OY_N$ and $OX_1$-$OX_M$ of the liquid crystal panel assembly 300.

As shown in FIG. 6, all of the plurality of amplifying units 810 have the same structure, and each amplifying unit 810 includes an amplifier AP, a capacitor Cf, and a switch SW. The amplifier AP has an inversion terminal (−), a non-inversion terminal (+), and an output terminal. The inversion terminal (−) is connected to the output data line OL. The capacitor Cf and the switch SW are connected between the inversion terminal (−) and the output terminal, and the non-inversion terminal (+) is connected to a reference voltage Va. The amplifier AP and the capacitor Cf are current integrators, that generate an amplification output signal Vo by integrating the output current from the output transistor Qs for a predetermined time.

Accordingly, the detection signal processor 800 converts an analog amplification output signal Vo from the amplifying unit 810 to a digital signal using an analog-to-digital converter (not shown) and processes the converted signal, thereby generating a digital detection data signal DSN.

The touch determination unit 700 receives the digital detection data signal DSN from the detection signal processor 800 and performs a predetermined operation that determines whether a touch has occurred and the touch position, and then sends touch information INF to an external device. The touch determination unit 700 monitors the operation state of the detection unit SU based on the digital detection data signal DSN to control a signal that is applied thereto. The touch determination unit 700 will be described later in detail.

The signal controller 600 controls the operation of the gate driver 400, the data driver 500, the gray voltage generator 550, and the detection signal processor 800.

Each of the driving devices 400, 500, 550, 600, 700, and 800 may be directly mounted on the liquid crystal panel assembly 300 in at least one IC chip form, be attached to the liquid crystal panel assembly 300 in a form of a tape carrier package (TCP) by being mounted on a flexible printed circuit film (not shown), or be mounted on a separate printed circuit board (PCB) (not shown). Alternatively, the driving devices 400, 500, 550, 600, 700, and 800 may be integrated to the liquid crystal panel assembly 300, along with the signal lines $G_1$-$G_n$, $D_1$-$D_m$, $SY_1$-$SY_N$, $SX_1$-$SX_M$, $OY_1$-$OY_N$, $OX_1$-$OX_M$, and RL and the thin film transistor Q.

Referring to FIG. 5, the liquid crystal panel assembly 300 is divided into a display area P1, an edge area P2, and an exposure area P3. Most of the pixels PX, the detection unit SU, and the signal lines $G_1$-$G_n$, $D_1$-$D_m$, $SY_1$-$SY_N$, $SX_1$-$SX_M$, $OY_1$-$OY_N$, $OX_1$-$OX_M$, and RL are positioned in the display area P1. The common electrode panel 200 includes a light blocking member (not shown) such as a black matrix, and because the light blocking member covers most of the edge area P2, light from the outside is blocked. Because the common electrode panel 200 is smaller than the thin film transistor array panel 100, a part of the thin film transistor array panel 100 is exposed to form the exposure area P3, and an integration chip 610 is mounted in and a flexible printed circuit board (FPC board) 620 is attached to the exposure area P3.

The integration chip 610 includes driving devices for driving an LCD, i.e. the gate driver 400, the data driver 500, the gray voltage generator 550, the signal controller 600, the touch determination unit 700, and the detection signal processor 800. The mounting area can be reduced and power consumption can be lowered by integrating the driving devices 400, 500, 550, 600, 700, and 800 within the integration chip 610. At least one among them or at least one circuit element for constituting them can be disposed at the outside of the integration chip 610, as needed.

The signal lines $G_1$-$G_n$ and $D_1$-$D_m$ and the detection data lines $SY_1$-$SY_N$ and $SX_1$-$SX_M$ are extended to the exposure area P3 to be connected to the corresponding driving devices 400, 500, and 800.

The FPC board 620 receives a signal from an external device to transfer the signal to the integration chip 610 or the liquid crystal panel assembly 300, and a tip thereof is formed as a connector (not shown) to facilitate connection to the external device.

Now, the display operation and the detection operation of the LCD will be described in detail.

The signal controller 600 receives input image signals R, G, and B and an input control signal for controlling the input image signals R, G, and B from an external graphics controller (not shown). The input image signals R, G, and B contain luminance information of each pixel PX, and luminance has grays of a given number, for example, 1024 ($=2^{10}$), 256 ($=2^8$), or 64 ($=2^6$). The input control signal includes, for example, a vertical synchronization signal Vsync, a horizontal synchronizing signal Hsync, a main clock signal MCLK, and a data enable signal DE.

The signal controller 600 appropriately processes the input image signals R, G, and B based on the input control signal according to an operating condition of the liquid crystal panel assembly 300, and generates a gate control signal CONT1 and a data control signal CONT2, then sends the gate control signal CONT1 to the gate driver 400, and sends the data control signal CONT2 and the processed image signal DAT to the data driver 500.

The gate control signal CONT1 includes a scanning start signal STV for instructing the scanning start, and at least one clock signal for controlling an output period of a gate-on voltage Von. The gate control signal CONT1 may further include an output enable signal OE for limiting a sustain time of a gate-on voltage Von.

The data control signal CONT2 includes a horizontal synchronization start signal STH for notifying the transfer start of a digital image signal DAT for one row of pixels PX, and a load signal LOAD and a data clock signal HCLK for applying an analog data voltage to the data lines $D_1$-$D_m$. The data control signal CONT2 may further include an inversion signal RVS for inverting the polarity of a data voltage to a common voltage Vcom (hereinafter, "polarity of a data voltage to a common voltage" is referred to as "polarity of a data voltage").

The data driver 500 receives a digital image signal DAT for one row of pixels PX according to the data control signal CONT2 from the signal control unit 600, converts the digital image signal DAT to an analog data voltage by selecting a gray voltage corresponding to each digital image signal DAT, and then applies the analog data voltage to the corresponding data lines $D_1$-$D_m$.

The gate driver 400 applies a gate-on voltage Von to the gate lines $G_1$-$G_n$ according to the gate control signal CONT1 from the signal control unit 600 to turn on the switching element Q that is connected to the gate lines $G_1$-$G_n$. Accordingly, a data voltage that is applied to the data lines $D_1$-$D_m$ is applied to the corresponding pixel PX through the turned-on switching element Q.

The difference between the common voltage Vcom and the data voltage that is applied to the pixel PX is represented by a charge voltage, i.e. a pixel voltage of the liquid crystal capacitor Clc. Liquid crystal molecules change their arrangement according to a magnitude of a pixel voltage, so that polarization of light passing through the liquid crystal layer 3 changes. The change in the polarization is represented by the change in transmittance of light by the polarizer, whereby the pixel PX displays luminance that is represented with a gray of an image signal DAT.

By repeating the process with a unit of one horizontal period (referred to as "1 H", the same as one period of a horizontal synchronizing signal Hsync and a data enable signal DE), a gate-on voltage Von is sequentially applied to all gate lines $G_1$-$G_n$ and a data voltage is applied to all pixels PX, so that an image of one frame is displayed.

The state of an inversion signal RVS that is applied to the data driver 500 is controlled so that a next frame starts when one frame ends, and the polarity of a data voltage that is applied to each pixel PX is opposite to the polarity in a previous frame ("frame inversion"). According to the characteristics of the inversion signal RVS, the polarity of a data voltage flowing through one data line may be periodically changed even within one frame (e.g. row inversion and dot inversion), or the polarity of the data voltage that is applied to one pixel row may be different from each other (e.g. column inversion and dot inversion).

The detection signal processor 800 reads an output signal from an output detection line OL within a predetermined period. The detection signal processor 800 again amplifies the output signal through a current-voltage amplifier, then converts the signal to a digital detection data signal DSN and transmits the signal to the signal controller 600. The signal controller 600 performs a touch recognition operation for determining whether a touch does or does not occur and the touch position by appropriately operating the signal from the detection signal processor 800, and transmits information to an external device. The external device transmits an image signal based on the information to the LCD. Alternatively, the external device may directly perform a touch recognition operation by directly transmitting the digital detection data signal DSN to the external device.

It is preferable that the detection signal processor 800 reads the output signal that is applied through output data lines $OY_1$-$OY_N$ and $OX_1$-$OX_M$ in the porch period between frames according to the detection data control signal CONT3. The detection signal processor 800 preferably performs the detection operation in the front porch period of the vertical synchronization signal Vsync. The use of the porch period is preferred, because the detection data signal has less influence on a driving signal from the gate driver 400 and the data driver 500 thereby increasing the reliability of the detection data signal. However, it is not necessary to perform the reading operation in each frame, and the reading operation can be performed once in a plurality of frames as needed. Further, at least two reading operations can be performed in a porch period, and at least one reading operation can be performed even within a frame except the porch period.

Referring to FIG. 6, the reading operation of the detection data signal will be described in detail.

The common voltage Vcom has a high level and a low level, and swings between the high level and the low level every 1 H.

The reset control signal RST has a turn-on voltage for turning on a reset transistor Qr and a turn-off voltage for turning off the reset transistor Qr. The turn-on voltage can be a gate-on voltage Von and the turn-off voltage can be a gate-off voltage Voff, and other voltages may be used. A turn-on voltage of the reset control signal RST is applied when the common voltage Vcom is at a high level.

If a turn-on voltage is applied to the reset transistor Qr, the reset transistor Qr is turned on to apply a reset voltage Vr that is applied to an input terminal to the detection data line SL, thereby initializing the detection data line SL with the reset voltage Vr. If a reference voltage Va is applied to the amplifying unit 810 with the start of an operation, a capacitor Cf of the amplifying unit 810 is charged with the reference voltage Va, and thus a magnitude of an output voltage Vo of the amplifier AP is the same as that of the reference voltage Va.

If the reset control signal RST becomes a turn-off voltage Toff, the detection data line SL is in a floating state, and the voltage that is applied to the control terminal of output transistor Qs changes based on the change of a common voltage Vcom and the change in capacitance of the variable capacitor Cv according to touch. According to the voltage change, a current of the detection data signal flowing to the output transistor Qs changes.

After the reset signal RST is changed to the gate-off voltage Voff, the switching signal Vsw is applied to the switch SW to discharge a voltage that is charged to the capacitor Cf.

After, a predetermined time, the detection signal processor 800 reads the amplification output signal Vo. It is preferable that the time for reading the amplification output signal Vo is set within 1 H time after the reset control signal RST becomes a turn-off voltage Voff. That is, it is preferable to read the amplification output signal Vo before the common voltage Vcom changes again to a high level. This is because the amplification output signal Vo also changes according to a level change of the common voltage Vcom.

Because the detection data signal changes based on the reset voltage Vr, the detection data signal can always have a fixed range of voltage level, whereby the position where touch occurs is easily determined.

When the common voltage Vcom is in a low level, the turn-on voltage of the reset control signal RST may be applied. The amplification output signal Vo is read before the common voltage Vcom again becomes a low level after changing to a high level. Further, the reset control signal RST may be synchronized with the gate signal that is applied to the last gate line $G_n$.

In this way, after reading an analog detection data signal using each amplifying unit 810, the detection signal processor 800 converts an amplification output signal Vo to the digital detection data signal DSN and sends the signal to the touch determination unit 700. The digital detection data signal DSN contains information corresponding to the difference between the amplification output signal Vo at a previous detection operation and the amplification output signal Vo at a current detection operation.

The touch determination unit 700 receives the digital detection data signal DSN and performs a suitable operation on the signal to determine whether or not a touch occurs and the touch position and transmits the information to an external device which transmits image signals R, G, and B to an LCD and thus displays a screen, a menu, and the like as selected by a user.

However, when the screen is continuously touched along a row or column direction, for example when the user laterally or vertically moves a slider bar, the digital detection data signal DSN that is entered to the touch determination unit 700 includes sequentially inaccurate touch information.

Figure 7A:
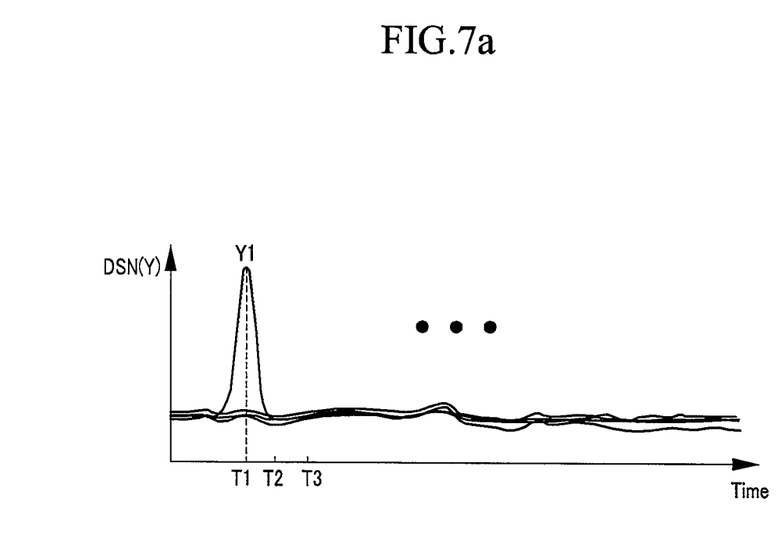
FIGS. 7A and 7B are signal waveform diagrams of a detection signal for a touch in a row direction.
Figure 7B:
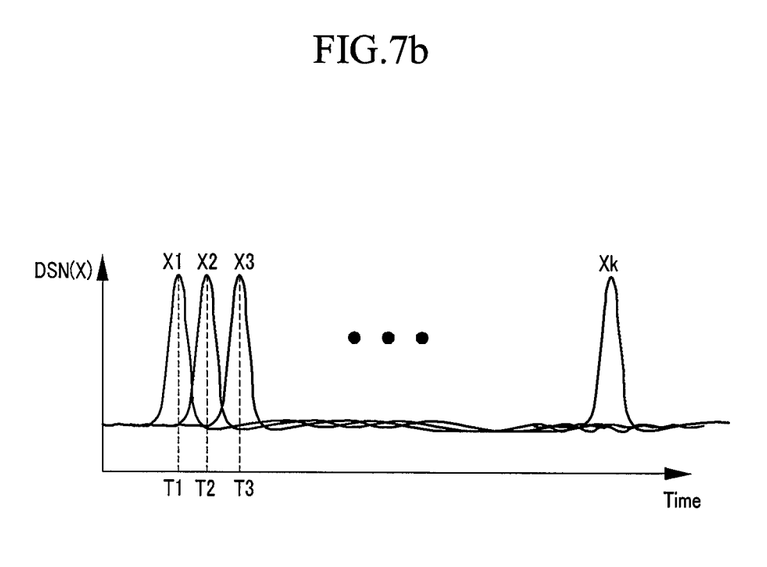
Figure 8:
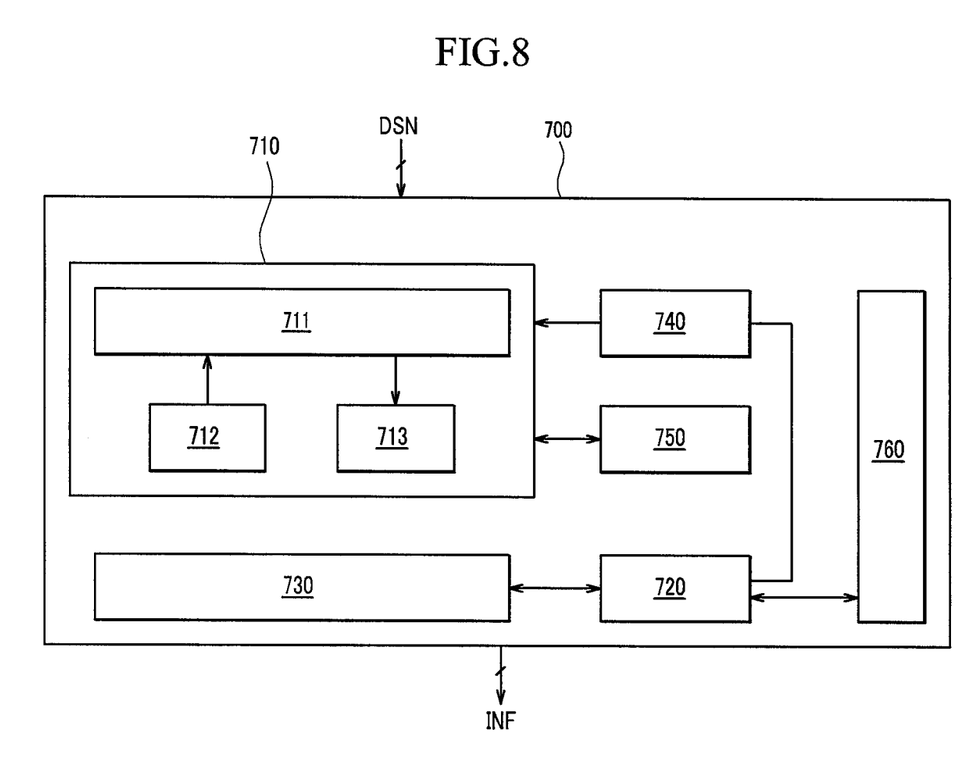
FIG. 8 is a block diagram of a touch determination unit according to an exemplary embodiment of the present invention.
Figure 9:
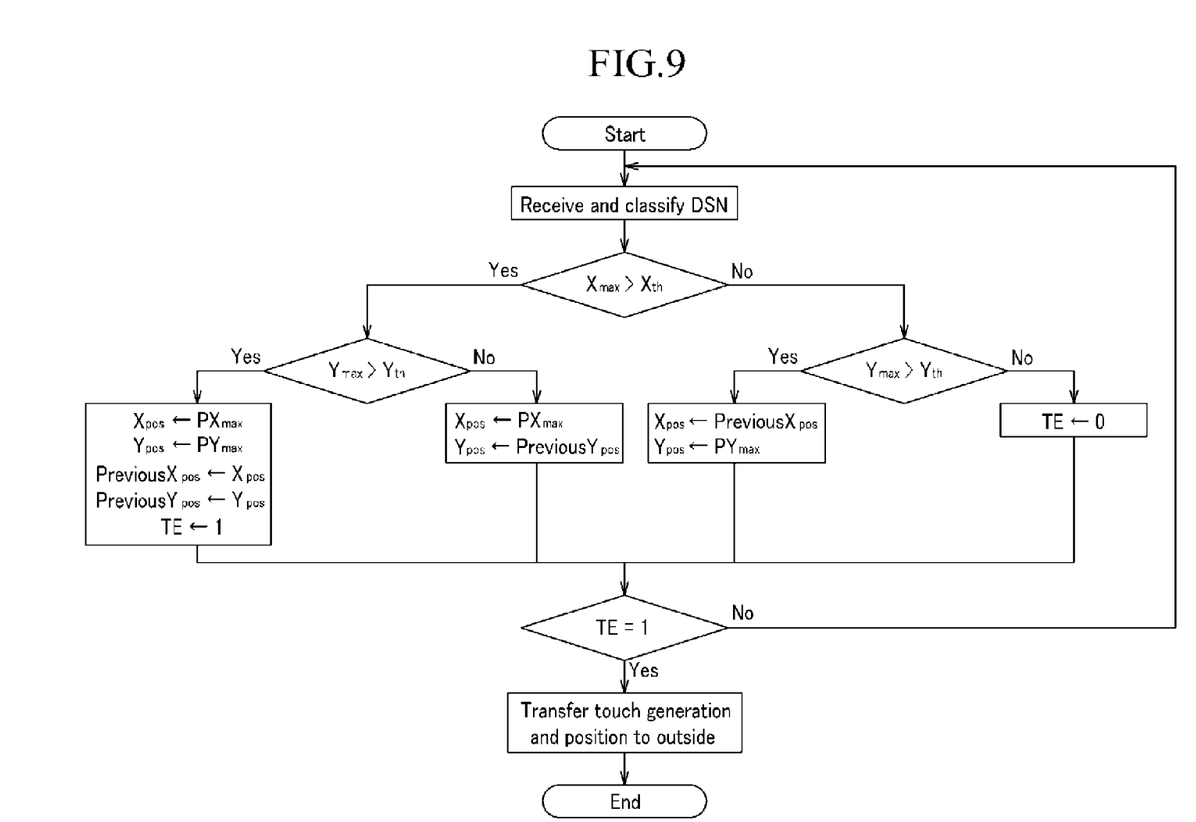
FIG. 9 is a flowchart of the operation of the touch determination unit that is shown in FIG. 8.

FIGS. 7A and 7B are signal waveform diagrams of a digital detection signal for the touch of a row direction, FIG. 8 is a block diagram of a touch determination unit according to an exemplary embodiment of the present invention, and FIG. 9 is a flowchart of the operation of the touch determination unit that is shown in FIG. 8.

Referring to FIGS. 7A and 7B, as an example, when the touch is detected from detection unit SU(1, 1) to SU(1, k), along a row of the display, the change of capacitance of variable capacitor Cv of the detection data line $SY_1$ is uniformly sustained during the time the row is touched so that the digital detection data signal DSN from the first detection operation T1 contains touch information. However, the next detection operation (T2, T3, . . . ) no longer contains touch information.

However, because the detection units SU connected to the different column detection data lines $SX_1$-$SX_k$ detect the touch at each detection operation (T1, T2, . . . ), the digital detection data signal DSN of each column detection data line $SX_1$-$SX_k$ contains touch information in each detection operation (T1, T2, . . . ).

A touch determination unit 700 for recognizing a continuous touch of a row or column direction will be described hereinafter.

Referring to FIG. 8, the touch determination unit 700 according to an exemplary embodiment of the present invention includes first and second controllers 710 and 720, a register unit 730, memories 740 and 750, and an interface unit 760.

The first controller 710 includes a memory 711, a data classification unit 712, and a touch state check unit 713, and they are formed with hard-wired logic. The first controller 710 may further include an initialization unit (not shown) for controlling an initial operation of the touch determination unit 700.

The data classification unit 712 reads the digital detection data signal DSN from the detection signal processor 800, divides the signal DSN into a column detection signal and a row detection signal, and then stores the signals in the memory 712.

The touch state check unit 713 determines whether the detection unit SU has detected a touch condition.

The second controller 720 is a processor such as an ARM, and it analyzes a digital detection data signal DSN of the memory 711 according to a program to determine whether the detection unit SU has detected a touch condition and the touch position.

In the register unit 730, a flag value for notifying an operation state of each device, touch position information Xpos and Ypos, and so on are stored.

The memory 740 is a flash memory, and it stores an operation program for operating the second controller 720.

In the memory 750, the row and column digital detection data signals DSN and several data required for an operation are stored, and the memory 750 is also a data memory for storing reference values Xth and Yth of a digital detection data signal DSN of the row and column digital detection data.

The interface unit 760 may be composed of a serial peripheral interface SPI, and it sends touch information INF, a control signal, or so on to an external device, and receives necessary data or a control signal from the outside.

The control operation of the touch determination unit 700 having such a structure will be described with reference to FIG. 9.

If the operation of the touch determination unit 700 starts, the data classification unit 712 receives a plurality of digital detection data signals DSN at a first detection operation (T1 of FIGS. 7A and 7B), classifies the signals into a row digital detection data signal DSN and a column digital detection data signal DSN, and stores the signals in the memory 711.

The touch determination unit 700 selects representative values Xmax and Ymax of each classified digital detection data signal DSN, and the representative values Xmax and Ymax may be the digital detection data signal DSN having the largest value. Next, a representative value Xmax of the column digital detection data signal is compared with a stored column reference value Xth, and a representative value Ymax of the row digital detection data signal is compared with a stored row reference value Yth.

When the representative values Xmax and Ymax of the row and column digital detection data signals is larger than each reference value Xth and Yth as in FIG. 9, previous touch position information Xpos and Ypos that is stored in the register unit 730 is converted to coordinates PXmax and PYmax of the detection unit SU of the representative values Xmax and Ymax.

If only one of the representative values Xmax and Ymax of the row and column digital detection data signals is larger than the reference values Xth and Yth, only the larger previous touch position information Xpos and Ypos is converted to coordinates PXmax and PYmax of the representative value, and the representative values Xmax and Ymax of the row and column digital detection data signals is smaller than or equal to the reference values Xth and Yth sustain previous touch position information Xpos and Ypos.

If the representative values Xmax and Ymax of both of the row and column digital detection data signals are smaller than or equal to the reference values Xth and Yth, previous touch position information Xpos and Ypos is sustained.

Next, the touch determination unit 700 determines whether the touch has occurred by counting the changed number of touch position information Xpos and Ypos of the register unit 730.

That is, if both of row and column touch positions are changed, the touch state check unit 713 activates a touch state flag by converting the touch state flag TE of the register unit 730 to 1, and if both of the row and column touch positions are not changed, the touch state check unit 713 inactivates the touch state flag by converting the touch state flag TE of the register unit 730 to 0.

Further, if only one of row and column touch positions is changed, the touch state check unit 713 sustains a previous state of the touch state flag TE.

The touch determination unit 700 reads the touch state flag TE of the register unit 730 to determine whether the touch has occurred, and if the touch has occurred, the touch determination unit 700 outputs touch generation and touch position information Xpos and Ypos of the register unit 730 to the outside through the interface unit 760.

When a value of the touch state flag TE is 0, the data classification unit 712 receives a digital detection data signal DSN of a next detection operation to perform the classification.

As shown in FIGS. 7A and 7B, as the screen is continuously touched in a row direction, the row direction of digital detection data signal DSN just sustains touch position information Ypos at the first detection operation T1, so that the row coordinate of the touch point can be grasped. This occurs even thought the digital data signal DSN has no touch information from the second detection operation T2.

In an exemplary embodiment of the present invention, a detection unit that uses a variable capacitor and a reference capacitor is exemplified, but a detection unit is not limited to the detection unit that uses the variable capacitor and the reference capacitor, and other forms of detection element can be used. That is, a common electrode of a common electrode panel and a detection data line of a thin film transistor array panel are used as two terminals, and at least one of two terminals is protruded, whereby two terminals are physically and electrically connected to each other by a user's touch, so that a pressure detection unit for outputting a common voltage as a detection data signal or a photo sensor having an output signal that changes according to intensity of light may be used. Further, the present invention can be applied to a display device including at least two kinds of detection units.

Further, in an exemplary embodiment of the present invention, an LCD is exemplified as a display device but the display device is not limited to the LCD, and the display device can be equally applied to a flat panel display such as a plasma display device and an organic light emitting device.

According to the present invention, when the screen is continuously touched along a row or column direction, the touch or lack thereof and the touch position can be accurately determined by using previous touch position information as current touch position information.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
    a display panel that comprises a plurality of pixels;
    a plurality of detection units formed in row and column directions in the display panel that generate an output signal based on a touch to the display panel;
    a detection signal processor that generates detection data based including row detection data and column detection data on the output signal; and
    a touch determination unit configured to determine whether the touch has occurred by comparing the detection data with a reference value including a row reference value and a column reference value,
    if the row detection data is greater than the row reference value and the column data is smaller than or equal to the column reference value, the touch determination unit is configured to change the row coordinate of the touch position and sustain a previous column coordinate, and
    if the column detection data is greater than the column reference value and the row data is smaller than or equal to the row reference value, the touch determination unit is configured to change the column coordinate of the touch position and sustain a previous row coordinate.

2. The display device of claim 1, wherein the touch determination unit compares a representative value of a plurality of row detection data with the row reference value; and
    compares a representative value of a plurality of column detection data with the row reference value.

3. The display device of claim 2, wherein the representative value is the largest value of the plurality of detection data.

4. The display device of claim 2 or 3, wherein the touch determination unit determines a coordinate of the representative value as a touch position if the representative value is greater than the reference value; and sustains a previous touch position if the representative value is smaller than or equal to the reference value.

5. The display device of claim 4, wherein the touch determination unit determines that the touch has occurred if both of the row and column coordinates are changed.

6. The display device of claim 5, wherein the touch determination unit sustains a previous touch state if one of the row and column coordinates is changed.

7. The display device of claim 6, wherein the touch determination unit determines that the touch has not occurred if both of the row and column coordinates are not changed.

8. The display device of claim 1, wherein the touch determination unit further comprises a register for storing a plurality of flag values.

9. The display device of claim 8, wherein the register stores a touch position flag and a touch state flag.

10. The display device of claim 1, wherein the detection unit comprises:
    a variable capacitor wherein liquid crystal is the dielectric material whose capacitance changes according to the pressure; and
    a reference capacitor that is connected in series with the variable capacitor.

11. The display device of claim 1, wherein the touch determination unit comprises hard-wired logic.

12. The display device of claim 1, wherein the touch determination unit comprises an advanced RISC machine (ARM) processor.

13. The display device of claim 12, wherein the touch determination unit further comprises:
    a data classification unit for classifying the detection data into row and column detection data; and
    a memory for storing the classified row and column detection data.

14. A driving method of a display device comprising a plurality of detection units for detecting touch and a plurality of pixels, comprising:
    reading an output signal from a detection unit for the row and column directions to generate detection data;
    classifying the row and column detection data according to the direction and changing of the row or column coordinate of the touch position or sustaining a previous coordinate by comparing the detection data of each direction with a reference value of each direction; and
    determining whether a touch has occurred according to a change of the touch position,
    changing the row coordinate of the touch position and sustain a previous column coordinate if the row detection data is greater than the row reference value and the column data is smaller than or equal to the column reference value, and
    changing the column coordinate of the touch position and sustain a previous row coordinate if the column detection data is greater than the column reference value and the row data is smaller than or equal to the row reference value.

15. The driving method of claim 14, wherein the determining of the touch position comprises:
    classifying the row and column detection data according to the direction;
    selecting a representative value of the detection data of each direction;
    comparing a representative value of each direction with the reference value; and
    changing or sustaining a coordinate of a touch position according to a compared result.

16. The driving method of claim 15, wherein the representative value is the largest value of a plurality of detection data.

17. The driving method of claim 16, wherein the determining the touch position comprises:
- determining a coordinate of the representative value as a touch position if the representative value is greater than the reference value; and
- determining a previous touch position as a current touch position if the representative value is smaller than or equal to the reference value.

18. The driving method of claim 17, wherein the determining of whether a touch has occurred comprises
- determining that the touch has occurred if both of the row and column coordinates of the touch position are changed, and determining that the touch has not occurred if both of the row and column coordinates of the touch position are not changed.

19. The driving method of claim 18, wherein the determining of whether the touch has occurred comprises sustaining a previous touch state if one of the row and column coordinates of the touch position is changed.

20. The driving method of claim 19, wherein the output signal is generated according to a change of capacitance caused by the touch.

21. The driving method of claim 20, wherein the detection data are generated according to the difference between a previous output signal and a current output signal.

* * * * *